United States Patent
He et al.

(10) Patent No.: US 8,843,172 B2
(45) Date of Patent: Sep. 23, 2014

(54) METHOD AND BASE STATION FOR DETERMINING AN INITIAL TRANSMISSION POWER

(75) Inventors: Feng He, Shenzhen (CN); Jianmin Fang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 368 days.

(21) Appl. No.: 13/259,780

(22) PCT Filed: May 31, 2010

(86) PCT No.: PCT/CN2010/073397
§ 371 (c)(1), (2), (4) Date: Dec. 22, 2011

(87) PCT Pub. No.: WO2010/145442
PCT Pub. Date: Dec. 23, 2010

(65) Prior Publication Data
US 2012/0115532 A1  May 10, 2012

(30) Foreign Application Priority Data
Jun. 30, 2009  (CN) .......................... 2009 1 0158450

(51) Int. Cl.
*H04B 7/00* (2006.01)
*H04W 52/54* (2009.01)
*H04W 52/50* (2009.01)
*H04W 92/20* (2009.01)

(52) U.S. Cl.
CPC .............. *H04W 52/50* (2013.01); *H04W 92/20* (2013.01)
USPC ........... 455/522; 455/69; 455/509; 455/452.1

(58) Field of Classification Search
CPC .............................. H04W 52/16; H04W 52/40
USPC ............. 455/522, 69, 67.11, 422.1, 436, 437, 455/452.1, 13.4, 500, 517, 525, 509, 515
See application file for complete search history.

(56) References Cited

U.S. PATENT DOCUMENTS

| | | | |
|---|---|---|---|
| 2010/0210243 A1* | 8/2010 | Vujcic | 455/411 |
| 2010/0329182 A1* | 12/2010 | Wigard et al. | 370/328 |
| 2012/0269166 A1* | 10/2012 | Chin et al. | 370/331 |

FOREIGN PATENT DOCUMENTS

| | | |
|---|---|---|
| CN | 1127059 A | 7/1996 |
| CN | 1866774 A | 11/2006 |

(Continued)

OTHER PUBLICATIONS

International Search Report for PCT/CN2010/073397 dated Aug. 19, 2010.

*Primary Examiner* — John J Lee
(74) *Attorney, Agent, or Firm* — Nixon Peabody LLP; Joseph Bach, Esq.

(57) ABSTRACT

A method for determining an initial transmission power and a base station is provided. The method comprises: a base station acquiring a measurement result of a second cell reported by said user equipment, wherein a first cell in which a user equipment (UE) is located belongs to the base station, and said first cell and said second cell belong to different base stations; and determining an initial transmission power of said user equipment when initiating a random access in said second cell according to a reference signal power of said second cell, said measurement result and a random access initial received target power of said second cell. Success rate of handover of user equipment is improved.

15 Claims, 4 Drawing Sheets

(56) References Cited

FOREIGN PATENT DOCUMENTS

| | | |
|---|---|---|
| CN | 1964212 A | 5/2007 |
| CN | 101075830 A | 11/2007 |
| CN | 101166044 A | 4/2008 |
| CN | 101166349 A | 4/2008 |
| WO | 2007/044316 A1 | 4/2007 |

* cited by examiner

METHOD AND BASE STATION FOR DETERMINING AN INITIAL TRANSMISSION POWER

CROSS-REFERENCE TO RELATED APPLICATIONS

This application is a National Phase of International Application No. PCT/CN2010/073397, which was filed on May 31, 2010, and which claims priority to and the benefit of Chinese Patent Application No. 200910158450.2, filed on Jun. 30, 2009, and the disclosures of which are hereby incorporated herein by reference in their entireties.

FIELD OF THE INVENTION

The present invention relates to the communication field and, in particular, to a method and a base station for determining an initial transmission power of an user equipment (abbreviated as UE).

BACKGROUND OF THE INVENTION

The long term evolution (abbreviated as LTE) network is consisted of E-UTRAN (Evolved UTRAN) base stations eNBs (Evolved NodeB) and an evolved packet core (abbreviated as EPC), which has a flat network structure.

In the cellular cell system, when a user moves, it is unavoidable that the user will move from one cell to another cell, which causes cell reselection or cell handover. For example, when a user moves during a phone call from the coverage of one cell to the coverage of another cell, in order to make the call uninterrupted, it is required for the user to be able to automatically switch between cells. The network side decides which cell the user switches to and when to switch, etc. According to the attachments of the cell before the handover and the cell after the handover, the handover can be divided into intra-cell handover, inter-cell handover in eNB, inter-eNB handover, handover between different access systems, etc. And the above various handover processes can be understood by referring to the process of inter-eNB handover. As shown in FIG. 1, it includes the following processing:

Step 101: UE reports a downlink measurement result to a serving base station (eNB1).

Step 102: eNB1 makes a handover selection and completes the handover preparation process with the handover target side eNB2.

Step 103: eNB1 informs via a signaling the UE to switch.

Step 104: the UE initiates a random access procedure toward the eNB2 according to the signaling.

In this case, the handover selection procedure at the network side in step 102 needs to give consideration to various factors comprehensively, and the measurement report of the UE in step 101 is one of the factors. When the serving signal quality of the present cell is below one certain threshold and the signal quality of one certain adjacent cell reported by the UE is above one certain threshold, the network side can inform the UE to switch. However, in order to avoid abnormality from occurring, the network side further needs to acquire some other auxiliary information for reference. For example, in order to avoid ping-pong handover from occurring, when switching, the network side needs to carry the history information of the UE, which includes information of the stay time of the UE in a previous cell during the calling or service and the like.

Since the current handover selection procedure mainly depends on the measurement of the downlink serving signals of an adjacent cell reported by the UE and the uplink sending is not taken into consideration, abnormal situations such as radio link failure (abbreviated as RLF) and the like can happen. For example, if RLF happens in a target cell shortly after the handover of the UE, then the UE cannot successfully access eNB2 in step 104, and one reason for this RLF is the unsatisfied uplink sending of the UE in the target cell.

In addition, in the LTE system, in order to reduce the manual maintenance work load of the network and optimize the network capacity, in the requirements currently proposed by the Next Generation Mobile Network (abbreviated as NGMN) organization, the LTE needs to support the self-organized network (abbreviated as SON) function which includes the coverage and capacity optimization (abbreviated as CCO) function of the network, i.e. the parameter configuration of a cell can be modified automatically by the automatic configuration function and self-optimization function of the network so as to achieve the optimization of network coverage.

In order to optimize the network coverage, the network side first needs to detect the existence of the current network coverage. As shown in FIG. 2, cells A and B governed by eNB1 and eNB2 are adjacent with each other, however, the cell B has coverage problem at the junction. At this moment, when the UE in cell B moves to the area D shown in the figure, phenomena such as dropped calls will occur. Therefore, how to find this coverage area is also a problem to be resolved.

SUMMARY OF THE INVENTION

Other features and advantages of the present invention will be described in the following description and partly become obvious from the description, or can be understood by implementing the present invention. The objects and other advantages of the present invention can be realized and obtained through the structures specified by the description, claims and drawings.

In order to achieve the above object, a method for determining an initial transmission power is provided according to one aspect of the present invention.

A method for determining an initial transmission power by a base station, wherein a first cell, in which a user equipment is located, belongs to the base station, according to the present invention comprises: acquiring a measurement result of a second cell reported by the user equipment, wherein the first cell and the second cell can be controlled by different base stations; calculating a downlink transmission path loss of the user equipment in the second cell according to a reference signal power of the second cell and the measurement result; using the calculated downlink transmission path loss as an uplink transmission path loss of the user equipment in the second cell; and determining an initial transmission power of the user equipment when initiating a random access in the second cell according to a random access initial receiving target power of the second cell and the uplink transmission path loss.

Preferably, calculating the downlink transmission path loss comprises: subtracting the measurement result from the reference signal power of the second cell to obtain the downlink transmission path loss; and calculating the initial transmission power comprises: adding the random access initial received target power of the second cell to the uplink transmission path loss to obtain the initial transmission power.

Preferably, a base station to which the second cell belongs informs a base station to which the first cell belongs of the reference signal power of the second cell and/or the random access initial received target power of the second cell via an X2 establishment request/response message or a base station configuration updating message.

After calculating the initial transmission power, the above method further comprises: when the measurement result reported by the user equipment meets a handover condition, comparing the initial transmission power with a first threshold value, if the transmission power is greater than the first threshold value, then using the second cell as a candidate target cell of a handover and continuing to select other cells which meet the condition to switch.

Preferably, the first threshold value is the maximum allowable uplink transmission power of the user equipment in the second cell.

Preferably, the base station to which the second cell belongs informs the base station to which the first cell belongs of the first threshold value via the X2 establishment request/response message or the base station configuration updating message, or it is preconfigured by an operation and maintenance system.

After calculating the initial transmission power, the above method can further comprise: if the measurement result reported by the user equipment is greater than a second threshold value, then comparing the initial transmission power with a third threshold value, and determining that there is an area with abnormal coverage between the first cell and the second cell when the initial transmission power is greater than the third threshold value, wherein the second threshold value is relevant to the downlink signal quality of the user equipment in the first cell and the third threshold value is relevant to the maximum uplink transmission power of the user equipment required by the second cell.

Preferably, the above method further comprises: sending indication information or sending the indication information and current location information of the user equipment to the base station to which the second cell belongs, wherein the indication information is for indicating that there is an area with abnormal coverage between the first cell and the second cell.

Preferably, the base station to which the second cell belongs informs the base station to which the first cell belongs of the second threshold value and/or third threshold value via the X2 establishment request/response message or the base station configuration updating message, or it is preconfigured by an operation and maintenance system.

In order to achieve the above objects, a base station is provided according to another aspect of the present invention.

The base station according to the present invention comprises: a receiver adapted to acquire a measurement result of a second cell reported by a user equipment in a first cell, wherein the first cell and the second cell are controlled by different base stations; a subtracter adapted to perform subtraction operation to the reference signal power of the second cell and the measurement result, and output the result to be an uplink transmission path loss of the user equipment in the second cell; and an adder adapted to perform addition operation to the random access initial received target power of the second cell and the uplink transmission path loss, and determine the initial transmission power of the user equipment when initiating the random access in the second cell according to the result.

Preferably, the above base station further comprises: a first comparer adapted to compare the initial transmission power outputted by the adder with a first threshold value; a handover controller adapted to determine whether to use the second cell as a candidate target cell of a handover according to the comparison result of the first comparer; a second comparer adapted to compare the initial transmission power outputted by the adder with a first threshold value, a second threshold value or a third threshold value; and a determination unit adapted to determine whether there is an area with abnormal coverage between the first cell and the second cell according to the comparison result of the second comparer.

By way of the embodiments of the present invention, the random access initial transmission power of the UE can be determined, and this can be used to optimize the handover selection procedure and the like. Compared to the related art, this can improve the success rate of the handover of the UE.

BRIEF DESCRIPTION OF THE DRAWINGS

The drawings herein are used to provide a further understanding of the present invention and form a part of the specification, which are used to explain the present invention together with the embodiments of the present invention without unduly limiting the scope of the present invention. In the drawings.

DETAILED DESCRIPTION OF THE EMBODIMENTS

Figure 1:
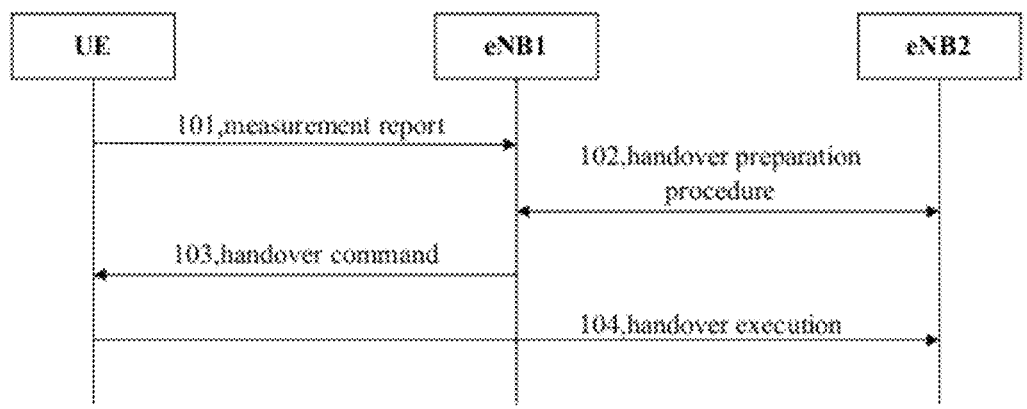
FIG. 1 is a flow chart of the interaction of the handover procedure between eNBs according to relevant art.
Figure 2:
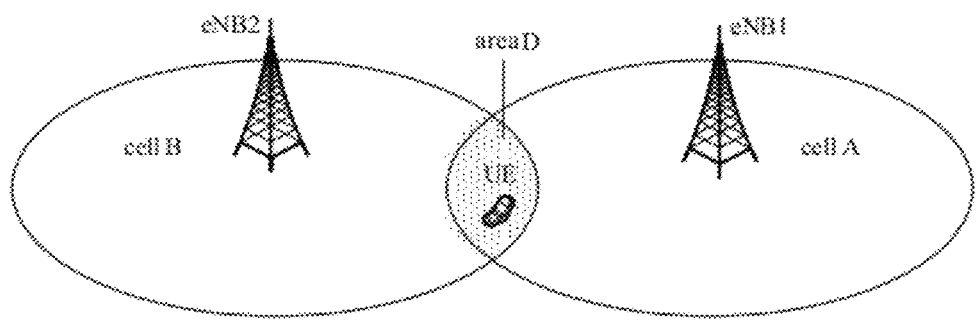
FIG. 2 is a schematic diagram of abnormal up/downlink coverage of a cell according to relevant art.

As described above, the existing handover selection procedure only considers the measurement of the current serving signals of adjacent cells reported by the UE and does not give consideration to the uplink sending factors of the UE. In the view of this situation, the embodiments of the present invention first provide a method for determining a random access initial transmission power, on the basis of which there is provided a method for optimizing handover selection and a method for determining area coverage.

The preferred embodiments of the present invention will now be described in conjunction with the drawings hereinafter. If there is no conflict, the embodiments of the present invention and the features in the embodiments can be combined with each other. In the following description, cells A and B are two adjacent cells which belong to two base stations eNB1 and eNB2 respectively.

Embodiment I

A base station is first provided according to the embodiments of the present invention. FIG. 3 shows a structural block diagram of this base station. As shown in FIG. 3, in order to achieve the function of acquiring the initial transmission power, this base station comprises the following structures.

A receiver 1 is adapted to acquire a measurement result of a cell B reported by UE, wherein the user equipment is located in a cell A and cells A and B are controlled by base stations eNB1 and eNB2 respectively and can be adjacent with each other.

A determination module 2 is adapted to determine an initial transmission power of said user equipment when initiating a random access in said second cell according to a reference signal power of said second cell, said measurement result and a random access initial received target power of said second cell.

Preferably, the above determination module 2 includes a subtracter 3 and an adder 5, which will be described in detail hereinafter.

The subtracter 3 connected to receive 1 is adapted to perform subtraction operation on the reference signal power of the cell B and the measurement result reported by the UE and output the result as a downlink transmission path loss of the UE in said cell B. Since the difference between the uplink path loss and downlink path loss during radio transmission procedure is very small, this downlink transmission path loss can be approximately used as the uplink transmission path loss.

The adder 5 connected to the receiver 1 is adapted to perform addition operation on the random access initial received target power of the cell B and the uplink transmission path loss and output the result as the initial transmission power of said user equipment when initiating the random access in said cell B.

Figure 3A:
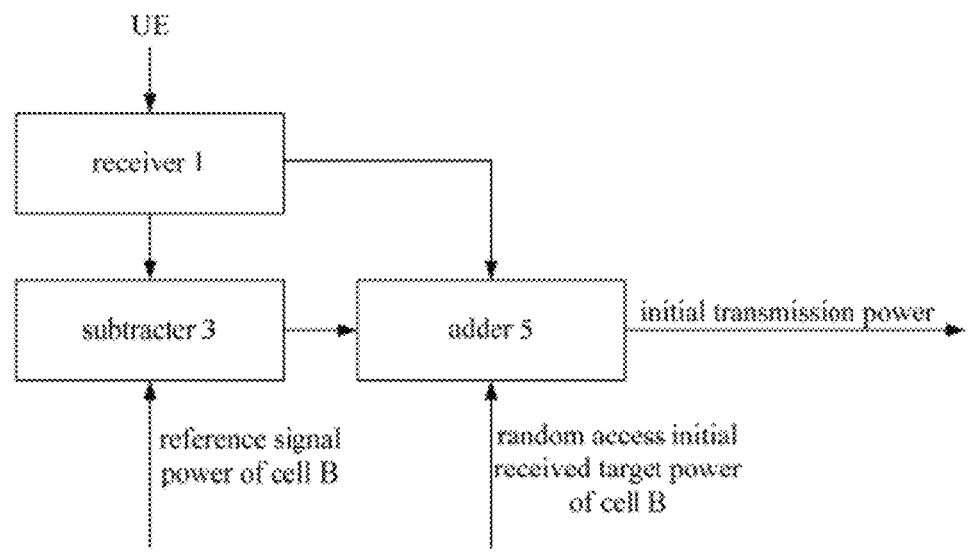
FIGS. 3A to 3C are structural block diagrams of a base station according to the embodiments of the present invention respectively.

Preferably, as shown in FIG. 3A, the subtracters 3 and the adder 5 can communicate with a controlled base station of the cell B and respectively acquire the reference signal power of the cell B provided by this base station and the random access initial received target power of the cell B as the input.

Figure 3B:
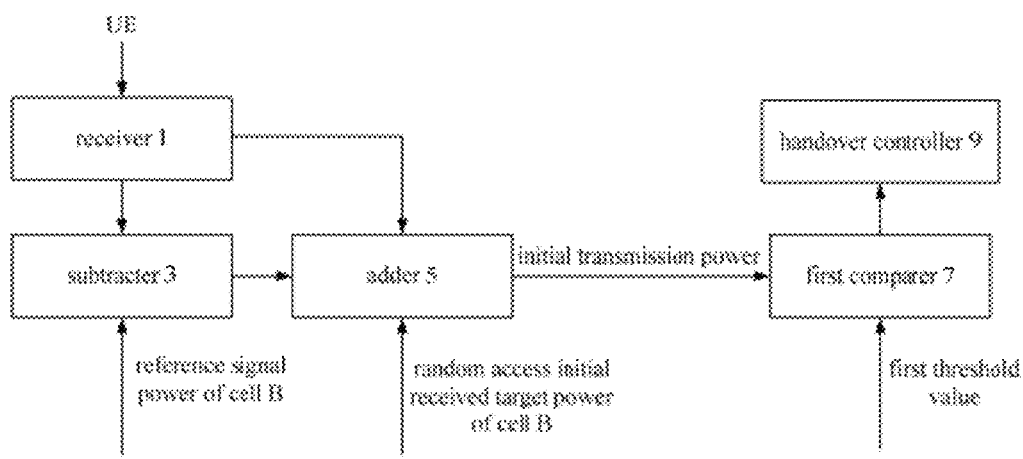

By running a base station which has the above structure, the initial transmission power of the UE can be acquired. After this initial transmission power is acquired, handover selection determination can be performed according thereto. Preferably, as shown in FIG. 3B, the base station provided according to the embodiments of the present invention, on the basis of the structure shown in FIG. 3A, can further comprise the following structures.

A first comparer 7 is adapted to compare the initial transmission power outputted by the adder 5 with a first threshold value; and preferably, the first threshold value here can be the maximum allowable transmission power of the UE in the uplink of the cell B and can also be other default values configured by an OAM system.

A handover controller 9 connected to the first comparer 7 is adapted to determine whether to use the cell B as a candidate target cell of a handover according to the comparison result of the first comparer 7. For example, if the initial transmission power is greater than this first threshold value, it is indicated that at this moment the uplink transmission power of the UE in the cell B is insufficient. And if the cell B is selected to be a target cell to switch, it is very possible that a radio link failure will occur.

Therefore, the cell B is used as a candidate cell at the handover target side and it is decided not to carry out the handover by using the cell B as the target cell for the time being.

By a base station with the above structure shown in FIG. 3B, it is implemented that the handover selection determination is carried out according to the uplink transmission situation, and in particular to the initial transmission power of the UE. Compared to the related art, the possibility of radio link failure can be reduced.

Figure 3C:
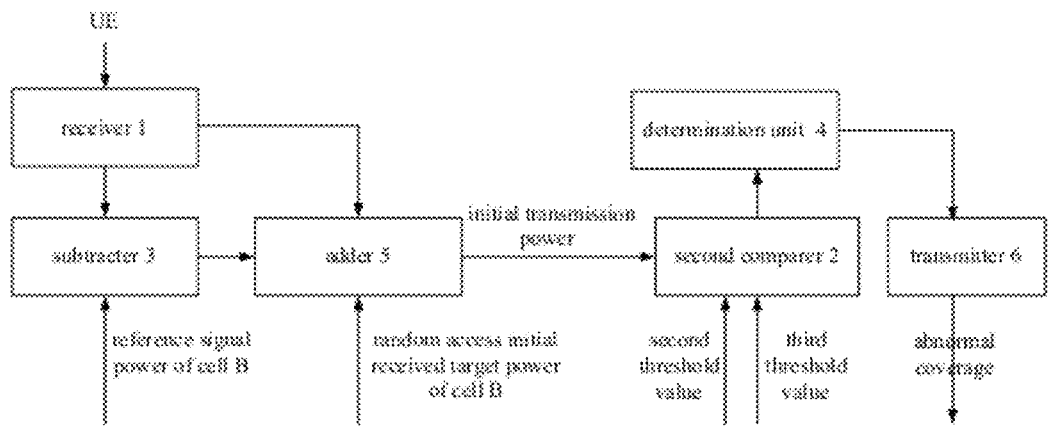

As described above, in order to avoid dropped calls when the UE moves to the overlapped area of two cells, it is needed to employ one certain means to find the overlapped area. For this end, the base station provided according to the embodiments of the present invention is configured with the components as shown in FIG. 3C for realizing the overlapped area of two cells. As shown in FIG. 3C, preferably, the base station according to the embodiments of the present invention comprises the following structures.

A second comparer 2 is adapted to compare the initial transmission power outputted by the adder 5 with a second threshold value. If it is greater than the second threshold value which is relevant to the downlink signal quality, then the initial transmission power is further compared with a third threshold value, with the third threshold value relevant to the maximum uplink transmission power that the cell B requires the UE to have in the present cell. It is easy to understand that this second comparer can be achieved by two sub-modules which have comparing function, in which one sub-module is adapted to achieve the comparison of the initial transmission power and the second threshold value and the other sub-module is adapted to achieve the comparison of the initial transmission power and the third threshold value.

A determination unit 4 is adapted to determine whether there is an area with abnormal coverage between the cell A and said cell B according to the comparison result of the second comparer 2. In particular, if the initial transmission power is less than the third threshold value, then it is indicated that there is an area with abnormal coverage between cells A and B.

After carrying out the above determination, the base station can inform the base station to which the cell B belongs of the situation that there is an area with abnormal coverage between cells A and B via a transmitter 6 which is connected to the determination unit 4. Preferably, the base station to which the cell B belongs can also be informed of the current location information of the UE. Thus, the subsequent base stations to which cell B belongs can carry out optimizing adjustment of network coverage.

Embodiment II

Figure 4:
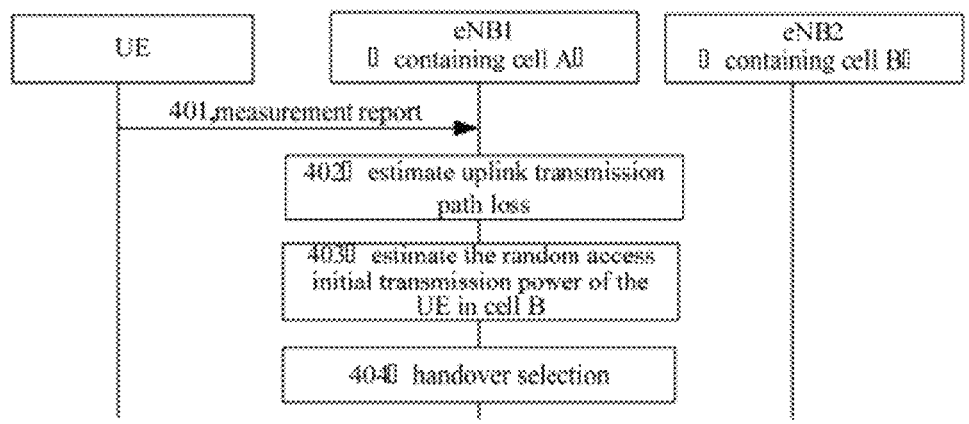
FIG. 4 is a flow chart of the interaction of a method for determining an initial transmission power and a handover selection method according to the embodiments of the present invention.

In this embodiment, eNB1 uses the random access initial transmission power of the UE in an adjacent cell as the basis of optimizing handover selection. As shown in FIG. 4, this method comprises the following processing:

Step 401: a UE which is located in a cell A reports the measurement result to eNB1, in which the measurement result of the signals of a cell B reported by the UE is contained;

Step 402: eNB1 calculates the downlink transmission path loss $PL_{DL}$ of the UE in the cell B according to the reference signal power (Reference Signal Power) of the cell B and the measurement result $M_N$ of the cell B by the UE, wherein since there is little difference between uplink path loss and downlink path loss during radio transmission procedure, the calculated downlink transmission path loss $PL_{DL}$ can be proximately used as the uplink transmission path loss $PL_{UL}$ of the UE in the cell B, i.e.:

$$PL_{UL} \approx PL_{DL} = \text{ReferenceSignalPower} - M_N$$

Step 403: eNB1 calculates the initial transmission power $P_{PRACH}$ of the UE when initiating a random access in the cell B according to the random access initial received target power (Preamble Initial received Target Power) of the cell B and the estimated uplink path loss $PL_{UL}$, such as:

$$P_{PRACH} = PreambleInitialReceivedTargetPower + PL_{UL};\text{ and}$$

Step 404: if the reported measurement result of the UE meets a handover condition, eNB1 will further make a handover selection according to the calculated initial transmission power $P_{PRACH}$ of the UE when initiating a random access in the cell B in step 403; if $P_{PRACH}$ does not meet the condition, i.e. $P_{PRACH}$ is greater than a first set threshold value $Thresh_{HO}$, or in other words, the uplink path loss does not meet the condition, i.e. $PL_{UL}$ is greater than the designated threshold value $Thresh_{HO}$ minus PreambleInitialReceivedTargetPower, then it is indicated that the uplink transmission power of the UE in the cell B is insufficient; if at this moment, the UE switches to the cell B, it is possible that the handover will fail since the random access of the UE is failed due to insufficient power; therefore, eNB1 uses the cell B as a candidate adjacent cell at the handover target side and continues to select other adjacent cells which meet the condition.

Preferably, the first threshold value $Thresh_{HO}$ used in step 404, on one hand, can be the maximum allowable uplink transmission power P-max of the UE in the cell B and can also be other default values configured by an OAM (operation and maintenance) system; and on the other hand, can also be configured by the OAM and can also be informed to eNB1 by eNB2.

By way of the above embodiment, it is possible that the base station can estimate the random access initial transmission power of the UE in an adjacent cell so as to optimize handover target selection, thus the success rate of handover of the UE can be improved.

Embodiment III

Figure 5:
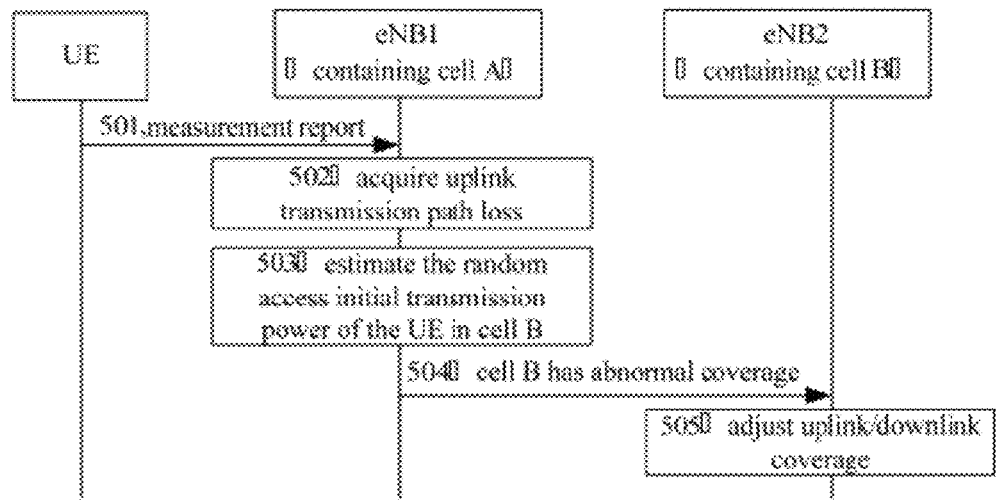
FIG. 5 is a flow chart of the interaction of a method for determining an initial transmission power and a method for determining overlapped areas according to the embodiments of the present invention.

In this embodiment, a method for finding an overlapped area of adjacent cells is provided. FIG. 5 shows a flow chart of the operation of this method. As shown in FIG. 5, this method comprises the following processing:

Steps 501 to 503 are the same as steps 401 to 403; and

Step 504: if the reported measurement result of the UE is greater than a second preset threshold value $Thresh_{PRE}$, then eNB1 would further determine the coverage problem of adjacent cells according to the calculated initial transmission power $P_{PRACH}$ of the UE when initiating a random access in the cell B wherein if $P_{PRACH}$ is greater than a third set threshold value $Thresh_{COVERAGE}$, then it is indicated that at this moment the uplink sending power of the UE in the cell B is insufficient, i.e. it is indicated that the cell B has abnormal coverage problem. At this moment, preferably, eNB1 informs eNB2 of the abnormal coverage information via an X2 port message.

Preferably, the second threshold value $Thresh_{PRE}$ used here can be configured by the OAM or can also be informed to eNB1 by eNB2. The third threshold value $Thresh_{COVERAGE}$ used here, on one hand, can be the maximum allowable uplink transmission power P-max of the UE in the cell B and can also be a default value configured by the OAM; and on the other hand, can be configured by the OAM and can also be informed to eNB1 by eNB2. In this case, the second threshold value can be related to the downlink signal quality of the UE in the cell A, for example, the adjacent cell threshold value measured and reported in an A3 event, and the third threshold value is related to the maximum allowable uplink transmission power of the UE in the cell B, for example, it can be the maximum allowable uplink transmission power $P_{-max}$ of the UE in the cell B.

Preferably, the abnormal coverage information informed to eNB2 by eNB1 can further include the current location information of the UE so that eNB2 can definitely learn the specific location of the abnormal coverage. The current location of the UE mentioned here can be the GPS location of the UE and can be reported to eNB1 by the UE via an idle port.

Step 505: after receiving the abnormal coverage information from eNB1, eNB2 takes this information into its own statistic data and carry out subsequent up/downlink coverage adjustment according to the statistic data.

As an optional solution, in step 504, eNB1 can also inform the OAM of the abnormal coverage situation of eNB2 and whether eNB2 needs to adjust the coverage parameters is decided uniformly by the OAM.

By the above embodiment, the base station can estimate the random access initial transmission power of the UE in an adjacent cell, timely find the overlap/coverage problem of the adjacent cell, and feed back this coverage problem to the adjacent cell, then the adjacent cell can carry out optimizing adjustment of coverage.

Figure 6:
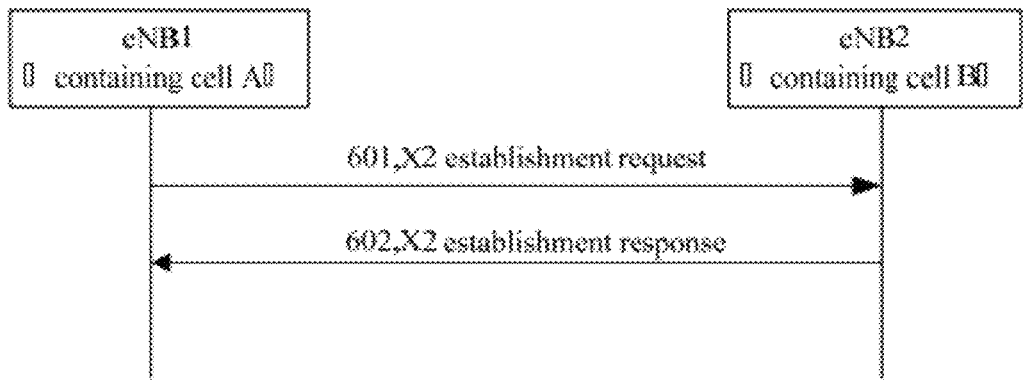
FIG. 6 is a flow chart of the signaling interaction of the X2 port establishment procedure according to the embodiments of the present invention.

Preferably, the first threshold value $Thresh_{HO}$, second threshold value $Thresh_{PRE}$, third threshold value $Thresh_{COVERAGE}$ mentioned in the above embodiments I and II can be informed to eNB1 by eNB2. For example, they can be informed through the X2 port establishment procedure (as shown in FIG. 5) or eNB configuration updating procedure (as shown in FIG. 6). In particular, corresponding parameters can be contained in serving cell information of relevant messages, i.e. the above one or more threshold values can be contained in the serving cell information of X2 port establishment/response message or eNB configuration updating message.

Preferably, the reference signal power Reference Signal Power information of the cell B and the random access initial received target power preamble Initial received Target Power of the cell B which is governed by eNB2 mentioned in embodiments I and II can be informed to eNB1 by the measurement report of the UE and can also be informed to eNB1 by eNB2, wherein the method of eNB2 informing eNB1 can be performed through the X2 port establishment procedure (as shown in FIG. 5) or eNB configuration updating procedure (as shown in FIG. 6). The reference signal power of the present cell is contained in the serving cell information of relevant messages, i.e. the above reference signal power is contained in the X2 port establishment request/response message or eNB configuration updating message.

The procedure of eNB2 informing eNB1 of corresponding parameters will be described in conjunction with FIGS. 6 and 7 hereinafter.

Example 1

FIG. 6 shows an X2 port establishment procedure. One or any combination of first threshold value, second threshold value, third threshold value, the reference signal power, the random access initial received target power can be transferred by this procedure and in particular by an X2 port establishment/response message. As shown in FIG. 5, it includes the following operations:

Step 601: eNB1 initiates an X2 establishment request message to eNB2, and the serving cell information of the cell A in the establishment request message contains one or more of the following information: the reference signal power ReferenceSignalPower information of the cell A, the first threshold value $Thresh_{HO}$, the second threshold value $Thresh_{PRE}$, the third threshold value $Thresh_{COVERAGE}$, and the random access initial received target power preambleInitialReceivedTargetPower; and Step 602: after receiving the X2 establishment request message, if the processing is successful, then eNB2 returns an X2 establishment response message to eNB1, and the serving cell information of the cell B in the establishment response message contains one or more of the following information: the reference signal power ReferenceSignalPower information of the cell B, the first threshold value $Thresh_{HO}$, the second threshold value $Thresh_{PRE}$, the third threshold value $Thresh_{COVERAGE}$, and the random access initial received target power preambleInitialReceivedTargetPower.

Figure 7:
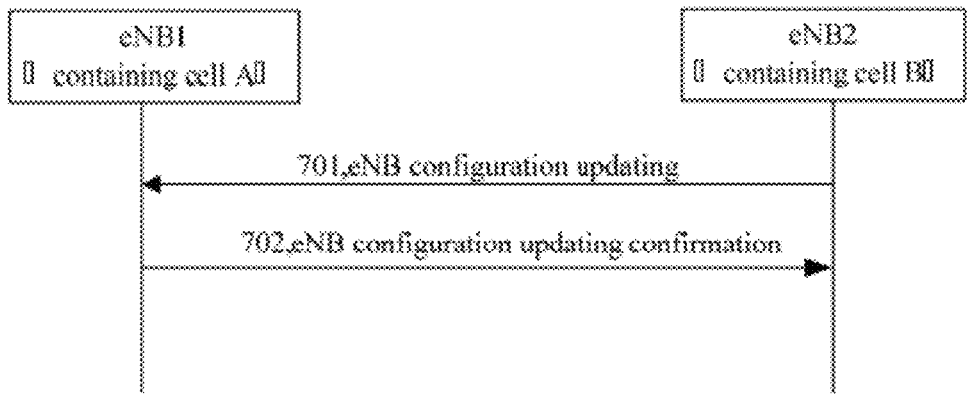
FIG. 7 is a flow chart of the signaling interaction of the eNB configuration updating procedure according to the embodiments of the present invention.

FIG. 7 shows an eNB configuration updating procedure, and one or more of the first threshold value, the third threshold value, and the reference signal power can be transferred by this procedure. As shown in FIG. 7, this procedure includes the following processing:

Step 701: eNB2 send an eNB configuration updating message to eNB1, and the serving cell information in the configuration updating message contains one or more of the following information: the reference signal power ReferenceSignalPower information of the cell B, the first threshold value $Thresh_{HO}$, the second threshold value $Thresh_{PRE}$, the third threshold value $Thresh_{COVERAGE}$, and the random access initial received target power preambleInitialReceivedTargetPower; and Step 702: after receiving the eNB configuration updating message, eNB1 returns an eNB configuration updating confirmation message to eNB2.

By way of at least one of the above technical solutions provided by the embodiments of the present invention, the uplink random access initial transmission power of the UE can be determined, based on which handover selection can be carried out, improving the success rate of handover of the UE, and whether there is overlapped network coverage between cells can be determined according to this determined initial transmission power so that the adjacent cells can carry out optimizing adjustment to the coverage.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for determining an initial transmission power, comprising:
   a base station acquiring a measurement result of a second cell reported by said user equipment, wherein a first cell, in which a user equipment is located, belongs to the base station, and said first cell and said second cell belong to different base stations; and
   said base station determining an initial transmission power of said user equipment when initiating a random access in said second cell according to a reference signal power of said second cell, said measurement result and a random access initial received target power of said second cell.

2. The method according to claim 1, wherein the step of said base station determining an initial transmission power of said user equipment when initiating a random access in said second cell according to a reference signal power of said second cell, said measurement result and a random access initial received target power of said second cell comprises:
   said base station determining a downlink transmission path loss of said user equipment in said second cell according to a reference signal power of said second cell and said measurement result;
   using said determined downlink transmission path loss as an uplink transmission path loss of said user equipment in said second cell; and
   determining an initial transmission power of said user equipment when initiating a random access in said second cell according to the random access initial received target power of said second cell and said uplink transmission path loss.

3. The method according to claim 2, wherein
   determining said downlink transmission path loss comprises:
   subtracting said measurement result from the reference signal power of said second cell and using the subtraction result as said downlink transmission path loss; and
   determining said initial transmission power comprises:
   adding said random access initial received target power of said second cell with said uplink transmission path loss and using the addition result as said initial transmission power.

4. The method according to claim 3, wherein a base station to which said second cell belongs informs a base station to which said first cell belongs of said reference signal power of said second cell and/or said random access initial received target power of said second cell via an X2 establishment request/response message or base station configuration updating message.

5. The method according to claim 2, wherein a base station to which said second cell belongs informs a base station to which said first cell belongs of said reference signal power of said second cell and/or said random access initial received target power of said second cell via an X2 establishment request/response message or base station configuration updating message.

6. The method according to claim 1, wherein a base station to which said second cell belongs informs a base station to which said first cell belongs of said reference signal power of said second cell and/or said random access initial received target power of said second cell via an X2 establishment request/response message or base station configuration updating message.

7. The method according to claim 1, wherein after determining said initial transmission power, said method further comprises:
   comparing said initial transmission power with a first threshold value when said measurement result reported by said user equipment meets a handover condition, wherein if said transmission power is greater than said first threshold value, then said second cell is used as a candidate target cell of a handover and it is continued to select other cells which meet the condition to switch.

8. The method according to claim 7, wherein said first threshold value is the maximum allowable uplink transmission power of said user equipment in said second cell.

9. The method according to claim 7, wherein the base station to which said second cell belongs informs the base station to which said first cell belongs of said first threshold value via the X2 establishment request/response message or base station configuration updating message; or said first threshold value is preconfigured by an operation and maintenance system.

10. The method according to claim 1, wherein after determining said initial transmission power, said method further comprises:
- determining that said measurement result reported by said user equipment is greater than a second threshold value;
- comparing and determining that said initial transmission power is greater than a third threshold value; and
- determining that there is an area with abnormal coverage between said first cell and said second cell;
- wherein said second threshold value is relevant to the downlink signal quality of said user equipment in said first cell and said third threshold value is relevant to the maximum uplink transmission power that said second cell requires said user equipment to have in the uplink.

11. The method according to claim 10, further comprising:
- sending indication information or sending said indication information and current location information of said user equipment to the base station to which said second cell belongs, with said indication information for indicating that there is an area with abnormal coverage between said first cell and said second cell.

12. The method according to claim 10, wherein the base station to which said second cell belongs informs the base station to which said first cell belongs of said second threshold value and/or third threshold value via the X2 establishment request/response message or base station configuration updating message; or said second threshold value and/or third threshold value are preconfigured by an operation and maintenance system.

13. A base station, comprising:
- a receiver, adapted to acquire a measurement result of a second cell reported by a user equipment in a first cell, wherein said first cell and said second cell belong to different base stations; and
- a determination module, adapted to determine an initial transmission power of said user equipment when initiating a random access in said second cell according to a reference signal power of said second cell, said measurement result and a random access initial received target power of said second cell.

14. The base station according to claim 13, wherein said determination module comprises:
- a subtracter, adapted to perform subtraction operation on the reference signal power of said second cell and said measurement result, and output the result as an uplink transmission path loss of said user equipment in said second cell; and
- an adder, adapted to perform addition operation on the random access initial received target power of said second cell and said uplink transmission path loss, and output the result as the initial transmission power of said user equipment when initiating the random access in said second cell.

15. The base station according to claim 13, further comprising:
- a first comparer, adapted to compare said initial transmission power outputted by said adder with a first threshold value;
- a handover controller, adapted to determine whether to use said second cell as a candidate target cell of a handover according to the comparison result of said first comparer;
- a second comparer, adapted to compare said initial transmission power outputted by said adder with a second threshold value, or with a second threshold value and a third threshold value; and
- a determination unit, adapted to determine whether there is an area with abnormal coverage between said first cell and said second cell according to the comparison result of said second comparer.

* * * * *